United States Patent
Kolavennu et al.

(10) Patent No.: US 7,471,242 B2
(45) Date of Patent: Dec. 30, 2008

(54) METHOD AND APPARATUS FOR INSTALLING AND/OR DETERMINING THE POSITION OF A RECEIVER OF A TRACKING SYSTEM

(75) Inventors: Soumitri N. Kolavennu, Minneapolis, MN (US); Anoop K. Mathur, Shoreview, MN (US); Seshan Srirangarajan, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 222 days.

(21) Appl. No.: 11/296,882

(22) Filed: Dec. 8, 2005

(65) Prior Publication Data

US 2007/0132637 A1    Jun. 14, 2007

(51) Int. Cl.
*G01S 3/02* (2006.01)
(52) U.S. Cl. .................................... 342/450
(58) Field of Classification Search ......... 342/450–465, 342/357.01–357.17
See application file for complete search history.

(56) References Cited

U.S. PATENT DOCUMENTS

| | | | |
|---|---|---|---|
| 5,706,014 A * | 1/1998 | Abbasi ................ | 342/357.1 |
| 5,926,133 A | 7/1999 | Green, Jr. | |
| 6,546,336 B1 * | 4/2003 | Matsuoka et al. ........... | 701/213 |
| 7,260,408 B2 * | 8/2007 | Friday et al. ............. | 455/456.1 |
| 2001/0034223 A1 | 10/2001 | Rieser et al. | |
| 2002/0143491 A1 | 10/2002 | Scherzinger | |
| 2004/0095276 A1 | 5/2004 | Krumm et al. | |
| 2006/0109131 A1 * | 5/2006 | Sen et al. ................ | 340/572.8 |
| 2007/0090995 A1 * | 4/2007 | Tamaki et al. ............... | 342/451 |

FOREIGN PATENT DOCUMENTS

| EP | 1253404 A2 | 10/2002 |
|---|---|---|
| WO | WO 98/34124 | 8/1998 |

* cited by examiner

*Primary Examiner*—Thomas H Tarcza
*Assistant Examiner*—Nga X Nguyen
(74) *Attorney, Agent, or Firm*—Kris T. Fredrick; Kermit Lopez; Luis Ortiz (57) ABSTRACT

The present invention pertains to the installation and positioning of the receivers of a wireless tracking system. In such a system, a wireless beaconing device transmits a signal that can be detected by a plurality of wireless receivers positioned at various known locations. Each wireless receiver records information derived from the signal from which it can make an estimate of the distance or relative position of the beaconing device. A controller correlates the information received from the multiple receivers and uses it to estimate the location of the individual. In such systems, the accuracy of the estimated position of the beaconing device depends on the accuracy to which the positions of the receivers are known. A technique is disclosed in which an installer carries a tracking device that can track the person's position and/or movements. The installer starts at a base location and resets the tracking device to cause the tracking device to record this position as the base position. The installer then walks to the location where the first receiving device will be installed while the tracking device tracks his or her movement or position. At the first installation location, the installer causes the tracking device to record this position as the position of the first receiver installed. The process is repeated for each receiver to be installed.

20 Claims, 4 Drawing Sheets

METHOD AND APPARATUS FOR INSTALLING AND/OR DETERMINING THE POSITION OF A RECEIVER OF A TRACKING SYSTEM

FIELD OF THE INVENTION

The invention pertains to a technique for installing and determining the locations of the receivers of a tracking system used to track the location of a beaconing device.

BACKGROUND OF THE INVENTION

There are circumstances under which it may be necessary or advisable to track the movements of one or more persons within a relatively well-defined space, such as a home, hospital, or prison. For instance, elderly or infirm persons that live alone or in a nursing home may need frequent or even relatively constant monitoring by caregivers. In order to reduce the staffing needs for monitoring and caring for persons in such situations and/or to reduce the burden on other family members or household members, it would be desirable to automate, to the extent reasonably possible, the monitoring of such persons.

For instance, in many instances it may be desirable to monitor the movement of a person about a house so as to know if that person is going to the bathroom or using the kitchen on a normal basis. Alternately, it may be desirable to track the movement of a person in order to assure that the person is moving on a regular basis and not incapacitated or otherwise unable to move.

In other situations, for instance, institutional situations such as nursing homes or hospitals, it may simply be advantageous to know the whereabouts of individuals so that they can be located for purposes of being provided medications or other care or simply to find them when they are missing.

SUMMARY OF THE INVENTION

In accordance with the principles of the present invention, one or more individuals carries a small, lightweight wireless beaconing device that sends out a low-power radio signal that can be detected by a plurality of wireless receivers positioned at various locations in a household (or other space). In a preferred embodiment of the invention, the receivers form nodes of a wireless network that further includes a controller at a control node with which the receivers can communicate. Alternately, the controller may be incorporated directly within one of the receiver nodes (e.g., within one of the control panels of the system).

The beaconing device transmits its signal at intervals. Each wireless receiver that receives the signal from the beaconing device records information derived from the signal, such as the signal strength, from which it can make an estimate of the distance or relative position of the beaconing device and sends that information to the control node. The control node correlates the information received from the multiple receivers and uses it to estimate the instantaneous location of the individual. Over time, the control node can determine the movements of the individual and evaluate that information to assess whether the individual requires attention from a caregiver.

The accuracy of the estimated position of the beaconing device based on the relative distance or position information received from the multiple receivers depends on the accuracy to which the positions of the receivers are known. However, in the home care situation described above, the tracking system, and particularly the receivers of the tracking system will likely be installed by a lay person, such as a nurse or a relative of the person that is to be tracked. Accordingly, it is important that the process of installing the receivers be made as simple as possible. A significant aspect of the installation of the receivers is reporting the precise location of the receiver once it is installed.

In a technique in accordance of the principles of the present invention, the installer carries on his or her person a tracking device that can track the person's position and/or movements in two or three dimensions. The tracking device, for instance, may comprise a pedometer for counting the person's steps (an accelerometer), a digital compass (a magnetometer) for tracking the direction the installer is moving, and/or an altimeter (a pressure sensor) for tracking changes in elevation. Additional or different apparatus that can be used to determine the position or movements of the installer also may be included in the tracking device. Such apparatus might include laser ranging devices, GPS receivers, and/or ultrasound ranging equipment.

In the process of installing the receivers, the installer starts out at a base location, such as the front entryway of the house. While in this location, the installer resets the tracking device to indicate a base position, such as by pressing a reset button on the tracking device. The tracking device will record this position as the base position, such as by assigning it the Euclidean X, Y, Z coordinates of 0, 0, 0. The person then walks to the location where the first receiving device will be installed while the tracking device tracks the movement of the installer. At the first installation location, the installer presses another button on the tracking device that causes the tracking device to record this position as a position of the first receiver installed. This position may be recorded in the tracking device for later downloading to the controller for the system. However, in a preferred embodiment of the invention, the tracking device instead wirelessly transmits the location information to the receiver that is being installed and that receiver stores that information. The position information may be a set of Euclidean coordinates relative to the base location. The installer then installs the receiver unit at this location, such as by a peeling off the protective backing of an adhesive strip and pressing the unit against the wall to cause it to stick to the wall.

The installer may then walk to the location in which a second receiving unit is to be installed while the tracking device tracks that movement and then repeat the same process with respect to the second receiving unit. However, in a more preferred embodiment of the invention, the installer will actually return to the base position, reset the tracking device, walk to the location in which the second receiving unit is to be installed, and repeat the process of downloading the position information into the second receiving unit, as described above with respect to the first receiving unit. It is more preferable to return to the base location and reset the tracking unit before installing each receiving unit because any errors in the tracking of the movement of the installer if he or she installs the multiple receivers without returning to the base location and resetting will accumulates over in the installation of a plurality of receivers. This will lead to less accurate recordings of the positions of each subsequently installed receiver.

DETAILED DESCRIPTION OF THE INVENTION

Home security systems are widely available in which a plurality of the detector devices, such as door and window monitors designed to detect the opening of a door or window (such as by the loss of electrical continuity between two electrodes in which one is mounted to the moveable window or door and the other is mounted to the frame of the window or door), and sound detectors (e.g., adapted to detect the sound of breaking glass) are coupled to one or more control panels from which the owner of the residence can control the security system. In addition, the system typically also includes an alarm node that will sound an alarm in the event of certain circumstances (e.g., a window being opened when the system is enabled). Often, the system is also hooked up to the telephone line so that it can make a telephone call to a security company when the alarm is activated. The detector nodes, control panel nodes, and alarm nodes essentially comprise a Local Area Network (LAN).

Typically, a security system for a household will have a control panel mounted near one or more of the primary entryways into the house and also in the master bedroom. A control panel commonly will comprise a keypad for entering data and an LED or LCD display for displaying information about the status of the security system. Typically, an individual enables or disables one or more portions of the security system by punching a security code into the keypad.

In many of these security systems, the various nodes are connected to each other through wires. However, recently, such security systems are wireless systems. That is, each node includes a radio frequency (RF) transmitter, receiver, or transceiver depending on the particular type of node and the nodes communicate with each other via low-power RF transmissions. For instance, the detector nodes for the doors and windows generally will only transmit. Control panel nodes generally will be both transmitters and receivers (i.e., transceivers). An alarm node may be a transceiver also, but could be only a receiver.

The Ademco™ technology developed by Honeywell International, Inc., is a radio chip set and a series of products that incorporate that chip set in conjunction with sensors is a wireless transceiver security system widely used throughout the United States and the world in wireless security systems such as those described above. The Ademco technology includes wireless control panels, wireless detectors, and even wireless remote transmitters that can be placed within key fobs, watches, jewelry, or other personal items for remotely enabling or disabling the security system. For instance, a person might press a button on the remote unit when he or she arrives home, which will then transmit a unique code to the control node of the system instructing the system to disarm.

All of these features of the Ademco system could be useful in a system for monitoring and tracking the movements of individuals about a household, institution, or any other space.

The present invention pertains to systems for monitoring the location and movement of a person about a household or other space by having the person carry a wireless beaconing device that periodically transmits a beacon signal. U.S. patent application Ser. No. 11/297,089, entitled Method and Apparatus for Tracking Persons, which is incorporated fully herein by reference, discloses an exemplary one of such a system for tracking person or objects and can be consulted for a full description thereof. However, the following is a brief discussion of that particular system, within which the principles of the present invention as described below can be incorporated.

Figure 1:
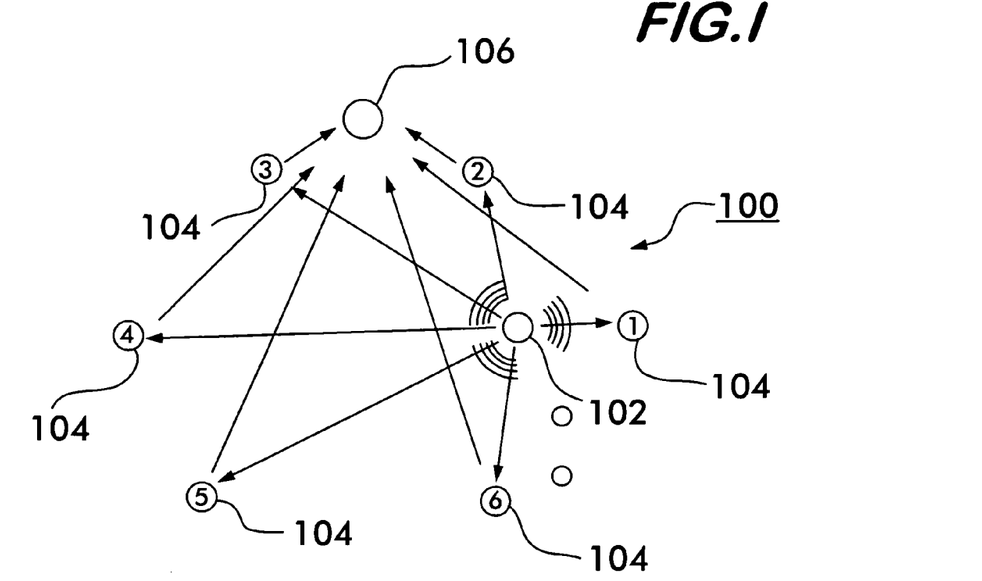
FIG. 1 is a block diagram illustrating the basic components of a tracking system incorporating the principles of the present invention.

FIG. 1 is a block diagram illustrating the basic components of a system 100 for tracking persons within which the present invention can be incorporated. In a preferred embodiment, a beaconing device 102 transmits a beaconing signal that includes (or solely comprises) a unique ID (although the unique ID would not be necessary if only one person is to be tracked in any given household). The household or other space is equipped with a plurality of wireless receivers 104 (hereinafter anchors or anchor devices) for receiving the signals transmitted by the beaconing device 102. The anchors 104 should remain stationary once installed. Each time the beaconing device 102 sends out a signal and it is received by one or more of the anchor devices 104, each anchor device records the ID of the beaconing device. The anchors also determine and record the received signal strength of the beaconing signal. The various IEEE 802.11 specifications provide an exemplary technique for measuring RSSI (Received Signal Strength Indicator) for a received radio signal. This technique would be one way to determine received signal strength. However, the received signal strength may be determined in any reasonable fashion.

Each anchor device that receives the beaconing signal sends the ID of the beaconing device (if the system is so adapted) and its signal strength information to a controller 106 at a control node of the wireless network 100. The anchor also should send a signal uniquely identifying the anchor unit that is transmitting the information so that the controller will know which anchor sent the information. The control node may comprise any reasonable computing device, such as a microprocessor, PC, ASIC, state machine, processor, combinational logic, and any combination of software and hardware. The controller need not be a separate node of the network, but can be incorporated in one or more of the anchor nodes of the system. The controller 106 correlates the information from the various anchor nodes and calculates an estimate of the position of the beaconing device. This process is repeated every time the beaconing device 102 transmits its signal.

The controller 106 must know the location of the reporting anchor devices in order to be able to convert the information signal strength information received from the anchor devices into a physical location. The present invention pertains to the technique by which the locations of the anchor devices is determined and reported to the controller, and this will be discussed in detail below. However, for the purposes of this overview of the system, we shall assume at this point, that the controller has already been programmed with the location of each anchor node within the space being monitored.

The control node 106 maintains a continuous record of the estimated location of the person. From this record, the movement of the person over a period of time can be determined relatively accurately. In one embodiment of the invention, the controller 106 may simply store this information for later retrieval by a caregiver. The controller may provide this information to the caregiver in any reasonable form, such a list of the start and end time of the tracked person in each room or a map showing a trail of the movement of the tracked person with or without time stamps. This information can be used to determine whether the person is moving about in a normal or expected fashion. It can also be used to determine if a person is going places within the space that he or she should not be. Furthermore, it can be used to determine if a person is visiting the bathroom too few or too many times.

For instance, if a tracked person has not moved from a single position for an extended period of time (during a period of the day it when they should not be sleeping or otherwise stationary), this might indicate a problem. Alternately, if, over the course of a 24 hour period, it is determined that an individual has not been in a bathroom or visited a room containing that person's medication, this may indicate another problem.

In a preferred embodiment of the invention, a plurality of anchor nodes are positioned throughout the household. In one embodiment of the invention, one anchor node may be positioned in each room of the household. In other embodiments, particularly smaller households or systems using an algorithm that can accurately estimate the location of a beaconing device with fewer anchor nodes, there may not be a need for an anchor device in every room.

Figure 2:
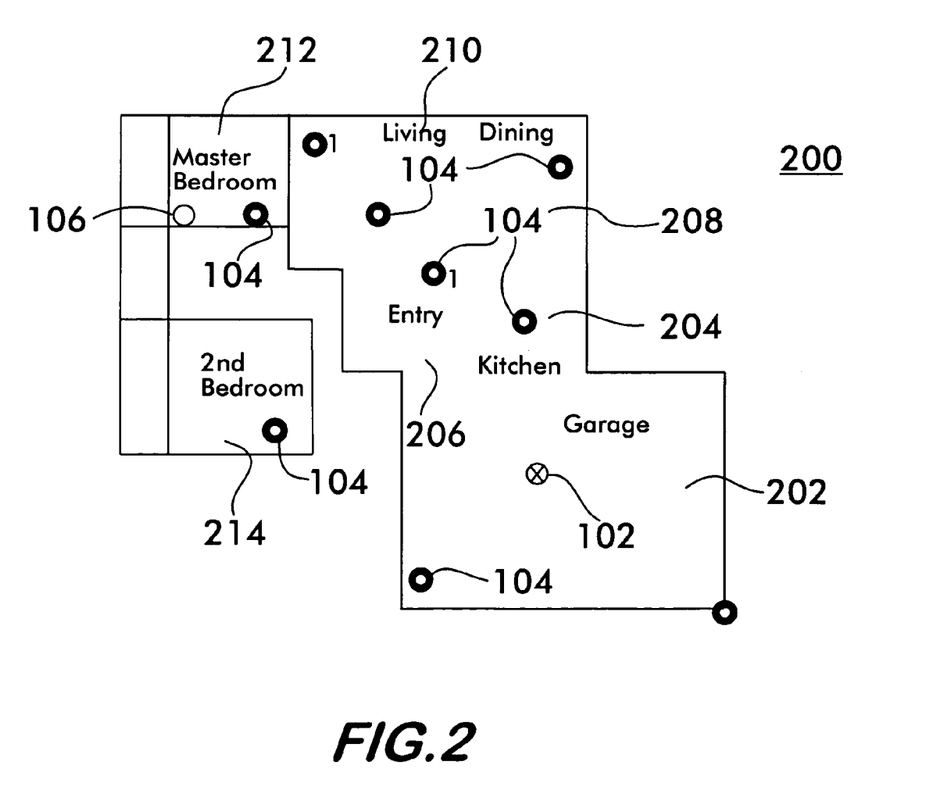
FIG. 2 is a schematic plan view of a household incorporating a tracking system in accordance with the principles of the present invention.

FIG. 2 is a block diagram illustrating a system in accordance with the principles of the present invention installed in a single level home. In this example, the home 200 comprises a garage 202, a kitchen 204, an entryway 206, a dining room 208, a living room 210, and two bedrooms, 212, and 214. Each room includes an anchor device 104. Anchor device 104 in master bedroom 212 also includes a controller 106. The system includes one or more wireless beaconing devices 102 carried on the person or persons to be monitored. Preferably, all communication between nodes of the network is wireless.

Figure 3:
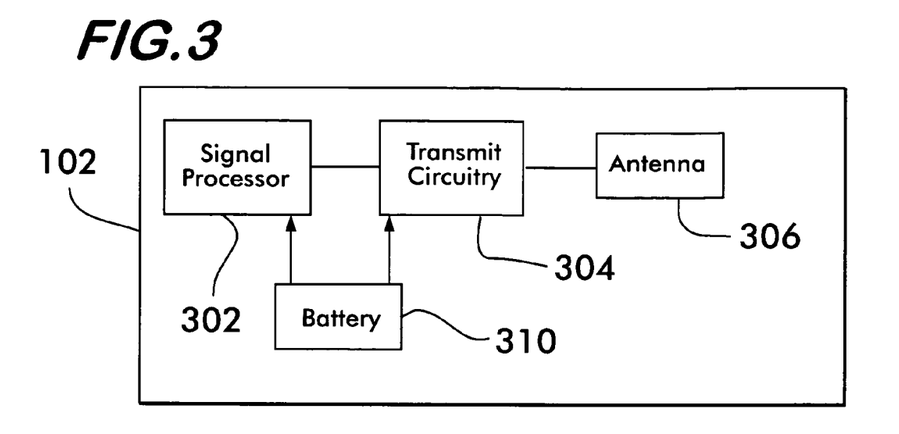
FIG. 3 is a block diagram illustrating the components of one of the wireless beaconing devices of FIG. 1 in accordance with a particular embodiment of the present invention.

FIG. 3 is a block diagram illustrating the basic components of an exemplary beaconing device 102. The beaconing device should contain minimal signal processing capabilities so that it can be made as small and light weight as possible whereby it can be easily worn or carried by the monitored individuals. The beaconing device contains signal processing circuitry 302 for generating the signal to be transmitted. It further comprises transmitter circuitry 304 for conditioning the signal for RF transmission. Merely as an example, the transmitter circuitry 304 typically might include circuitry for converting the signal from digital to analog form, circuitry for frequency up-converting the signal to RF, and other signal conditioning circuitry that would be well within the understanding of those of skill in these arts. The unit 102 further includes a transmission antenna 306. The signal processing circuitry 302 and transmitter circuitry 304 may be provided by one or more ASICs, microprocessors, analog hardware, digital hardware, or any other reasonable technology. The transmit circuitry outputs the transmit signal to an antenna 306 for transmission. The unit should be powered by a long-life, small, lightweight battery 310.

Preferably, each beaconing device transmits a binary signal that uniquely identifies that device. The system 200, of course, will be programmed to know what individual is carrying that particular device so as to be able to identify the individual from the particular ID.

Figure 4:
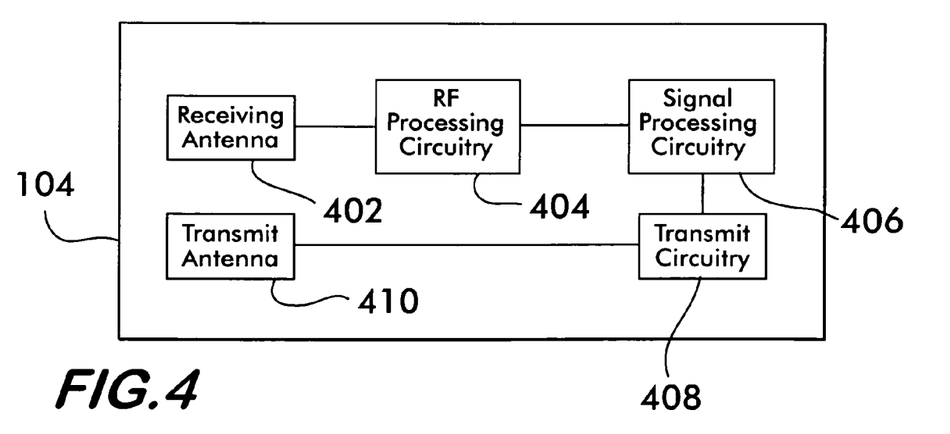
FIG. 4 is a block diagram illustrating the components of one of the wireless receivers of FIG. 1 in accordance with a particular embodiment of the present invention.

FIG. 4 is a block diagram illustrating the basic components of an exemplary anchor device 104. The anchor device includes a receiving antenna 402 and RF processing circuitry 404 coupled to the antenna for extracting the signal received from the beaconing devices. Circuitry 404 typically would include circuitry for frequency down converting the received RF signal to a baseband signal and converting it from analog to digital. Anchor device 104 further comprises signal processing circuitry 406 for at least determining the received signal strength. In a preferred embodiment, circuitry 406 also determines the particular ID received. The anchor device also includes transmit circuitry 408 and a transmit antenna 410 for transmitting the signal strength information and/or ID information to the control node. The receive and transmit antennas, of course, may be the same single antenna.

Figure 5:
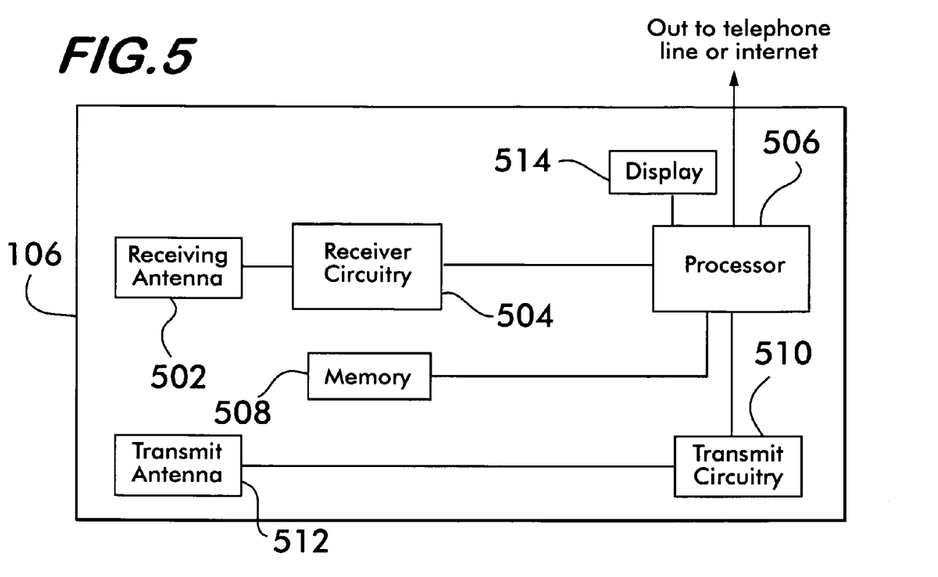
FIG. 5 is a block diagram illustrating the components of the controller of FIG. 1 in accordance with a particular embodiment of the present invention.

FIG. 5 is a block diagram of the basic components of the controller 106 of the system. It includes a receiving antenna 502. It also includes receiver circuitry 504 for extracting the signal strength and/or ID information received from the anchor nodes 104 and converting it to baseband digital signals. It further includes a processor 506 for analyzing the data received from the anchor nodes 104 in order to estimate the location of the one or more beaconing devices 102 based on that information. It includes a memory 508 for storing that information over time so as to be able to construct the movement of the beaconing devices over time and process that data to create a log or map of the movement of the beaconing device(s) over time. As noted above, the controller is preferably also programmed or otherwise adapted to analyze the movement data and identify any unusual movements or lack thereof of individuals. Even further, the controller may be programmed or otherwise adapted to issue a special notification if it does detect any tracking information indicating unusual or unexpected behavior of the person being monitored. For instance, the controller may send an email or make a telephone call to a caretaker if it detects unusual behavior. Alternately, if the system is actively monitored by an individual, such as might be the case in an institution such as a nursing home or hospital, the controller may include a display device 514, such as a computer monitor, and might simply display a warning on the screen of the monitor when it detects unusual behavior.

Furthermore, although not particularly relevant to the principles of the present invention, the controller likely also includes transmit circuitry 510 and a transmit antenna 512 for sending signals and information to the anchor nodes. Particularly, the controller 106 will include programming for running the entire network. Such functionality typically would require that the controller not only be able to receive information from the anchor nodes, but also transmit information to them. For instance, the controller may periodically test anchor nodes to make sure they are operating properly. Also, it may occasionally the send new software to the anchoring nodes.

Various algorithms can be employed for estimating the location of the monitored individual based on the received signal strength. For instance, in one embodiment of the invention, the system can make a relatively broad determination of the instantaneous location of the person by simply deciding that the person is closest to the anchor device that reports the strongest signal strength. For example, if there is an anchor device in each room, then the person can be assumed to be in the room of the anchor device receiving the strongest signal. In many instances, this will be sufficient information for reasonably monitoring the individual.

However, if more precise estimation is desired, a more complex algorithm for estimating the location of the person can be employed. For instance, an algorithm can be used that considers the relative signal strengths recorded by multiple anchoring devices and triangulating the position on the person based on those relative signal strengths.

U.S. patent application Ser. No. 11/298,882, entitled Method and Apparatus for Estimating the Location of a Signal Transmitter, incorporated herein fully by reference, discloses a novel technique for accurately estimating the location of a person based on the signal strengths of the transmit signal as received at multiple locations, such as multiple anchor devices. Reference can be made to that patent application for a detailed discussion of that technique. However, below is a brief discussion of that technique.

Generally, the weaker the received signal strength, the further away the beacon is from that particular anchor. It has been determined that highly accurate beacon location estimates can be obtained by solving an optimization problem to minimize the squared error over all of the anchors that received the signal from the beacon between (1) the predicted distance between the anchor and the beacon and (2) the distance between the known coordinates of the anchor and the estimated coordinates of the beacon. This error between (1) the distance estimate between any given anchor and the beacon, on the one hand, and the distance between the known coordinates of that anchor and the estimated coordinates of the beacon can be expressed as:

$$J_i = \sqrt{(X_i - X_B)^2 + (Y_i - Y_B)^2} - d_i$$

where i=an index identifying the particular anchor (I=1 through 6 in this example having 6 anchors);

$X_B, Y_B$=the Euclidian coordinates of the beacon;

$X_i, Y_i$=the Euclidean coordinates of anchor i; and $d_i$=the distance estimate based on the signal strength of the received signal at anchor i.

Thus, the minimization problem can be expressed as:

$$\min_{X_B, Y_B} \sum_{i=1}^{n} J_i^2$$

where n=the number of anchors receiving the beacon signal.

While this algorithm is adequate for many circumstances, in a preferred embodiment of the invention, the accuracy of the estimated location $X_B, Y_B$ of the beacon can be significantly increased by multiplying each squared error, $J^2$, by a weighting factor, $w_i$. The weighting factor would be assigned based on the likely accuracy of the distance estimate for the particular anchor.

For instance, in general, the weaker the received signal strength, the further away the beacon is from that particular anchor. However, in addition, the weaker the received signal strength (i.e., the further the beacon is from the particular anchor), the less accurate the distance estimate, $d_i$.

Thus, with a weighting factor incorporated into the algorithm, the minimization equation for solving for the estimated distance, $X_B, Y_B$ of the beaconing device in accordance with the preferred embodiment of the invention can be expressed as:

$$\min_{X_B, Y_B} \sum_{i=1}^{n} w_i J_i^2$$

where $w_i$=the weighting factor for anchor i.

The algorithm is easily extended to three dimensions for a multilevel house or any other environment in which elevation is a factor.

In another embodiment of the invention, it may be possible to record the precise time of receipt of the signal at each anchor device and compare those times of receipt to each other to determine the differences between times of receipt and then trilaterate the position of the person based on that information. This technique would not use signal strength at all, but merely delay. In even further embodiments of the invention, an algorithm that uses both received signal strength and delay can be implemented.

The invention is particularly advantageous because it can be virtually entirely implemented with existing technology such as the control panels, controller, and remote transmitters (e.g., key fob) of a household security system. The control panels essentially can be used as the anchors with minimal reprogramming. Also, the remote transmitters can be used as the beaconing devices with minimal modifications. For instance, instead of requiring the pressing of a button in order to cause it to transmit a signal, the unit is programmed to transmit the signal at fixed intervals. Finally, the controller of the security system can be used as the controller of the tracking system. It would simply need new or additional software.

The accuracy of the estimated position of the beaconing device based on the relative distance or position information received from the multiple receivers depends on the accuracy to which the positions of the receivers are known. However, in the home care situation described above, the tracking system, and particularly the receivers of the tracking system will likely be installed by a lay person, such as a nurse or a family member of the person that is to be tracked. Accordingly, it is important that the process of installing the receivers be made as simple as possible. A significant aspect of the installation of the receivers is reporting the precise location of the receiver once it is installed.

In a technique in accordance of the principles of the present invention, the installer carries on his or her person a tracking device that can track the person's position and/or movements in two or three dimensions. An exemplary tracking device 600 is shown in block diagram form in FIG. 6. The tracking device 600 may comprise a pedometer 602 for counting the person's steps (essentially an accelerometer), a digital compass 604 (essentially a magnetometer) for tracking the direction the installer is moving, and/or an altimeter 606 (a pressure sensor) for tracking changes in elevation. All of these detectors 602, 604, 606 are coupled to a signal processor 608 adapted to record this information and process it in order to perform the calculations and other operations described below in order to practice the present invention. Additionally, the device 600 preferably can communicate with other equipment, such as the anchor devices wirelessly. Accordingly, it further includes transmitting circuitry 610 and an antenna 612 for transmitting information wirelessly.

Figure 6:
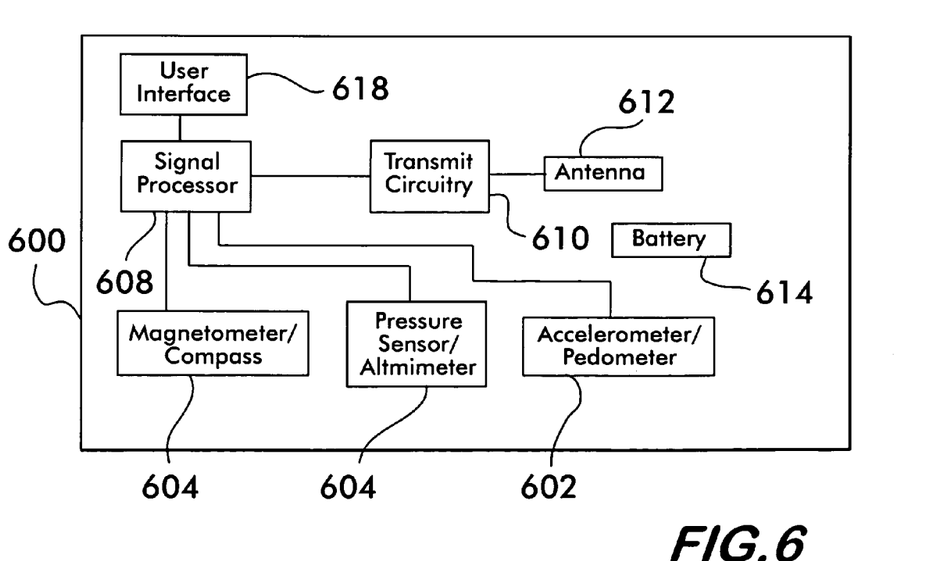
FIG. 6 is a block diagram illustrating the components of the tracking device in accordance with a particular embodiment of the principles of the present invention.

The tracking device also may include a user interface unit 618 through which the user can interface with the signal processor in order to input information and/or retrieve information from the device 600. Since the tracking device should be easily portable, it also should include a battery 614 for powering the various other components of the device.

Additional or different apparatus (not shown) that can be used to determine the position or movement of the installer also may be included in the tracking device. Such apparatus might include laser ranging devices, GPS receivers, and/or ultrasound ranging equipment. Also, the pedometer would need to be calibrated to the stride length of the installer. Pedometers capable of such calibration as well as techniques for performing such calibration are well known in the art and need no further exposition herein.

Figure 7:
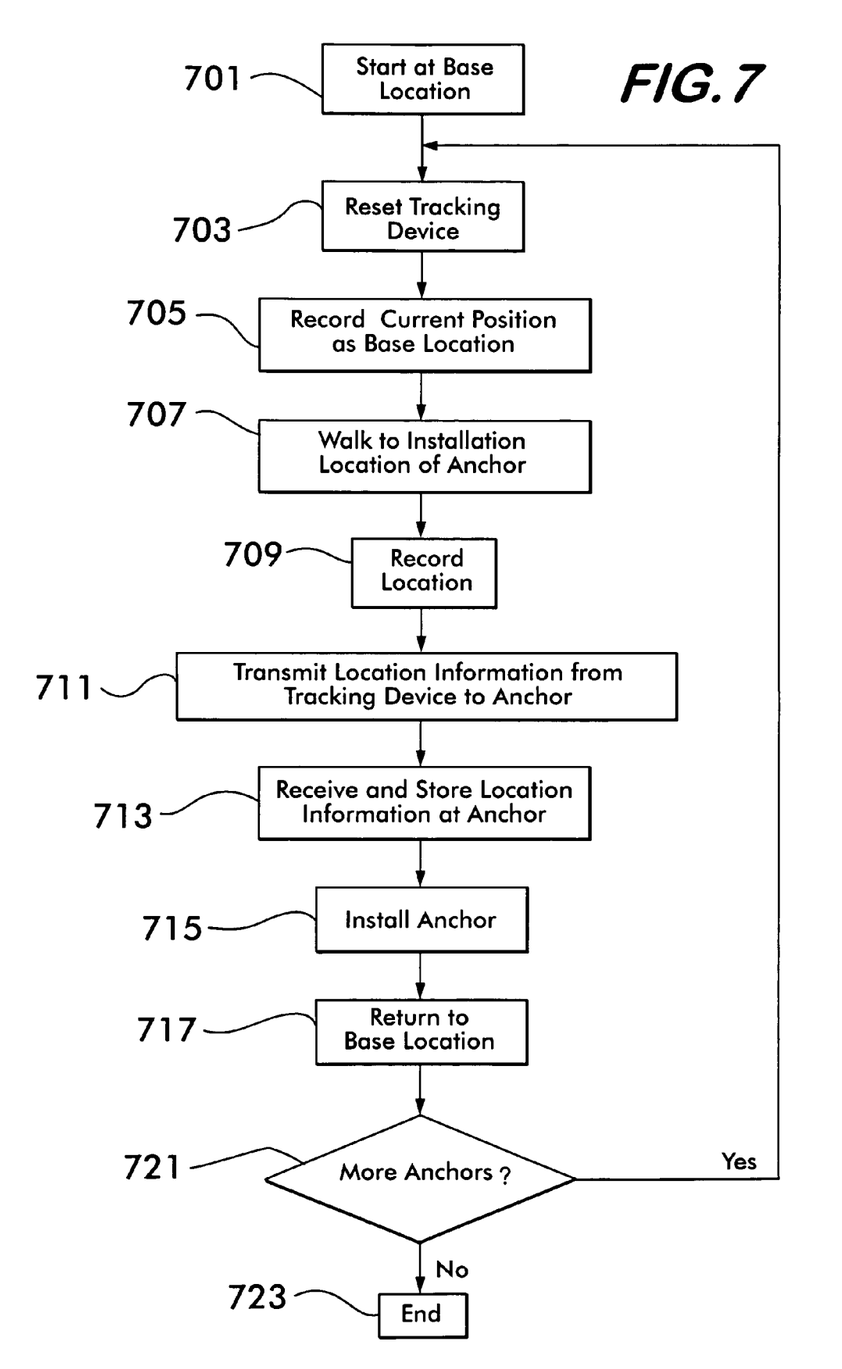
FIG. 7 is a flowchart illustrating the process of installing, determining, and recording the locations of the receiving units in accordance with a particular embodiment of the present invention.

FIG. 7 is a flow chart outlining a process for installing the receivers in accordance with an embodiment of the present invention. In step 701, the installer starts out at a base location, such as the front entryway of the house. While in this location, the installer resets the tracking device to indicate a base position, such as by pressing a reset button on the tracking device (step 703). Responsive to activation of the reset button, the tracking device records this position as the base position, such as by assigning it the Euclidean coordinates of X=0, Y=0, Z=0 (step 705). The installer then walks to the location where the first anchor device will be installed while the tracking device 600 tracks the movement of the installer (step 707). At the first installation location, the installer presses another button on the tracking device that causes the tracking device to record this position as a position of the first receiver installed (step 709). The position information may be a set of Euclidean coordinates relative to the base location. This position may be recorded in the tracking device for later downloading to the controller for the system. However, in a preferred embodiment of the invention, the tracking device instead wirelessly transmits the location information to the receiver that is being installed (step 711). That receiver stores that information (step 713).

The tracking device may transfer this position information to the anchor device by a wired connection. For instance, both the tracking device and the anchor may be equipped with ports that can be temporarily connected to each other via a cable. Preferably, however, in order to minimize equipment needs and to keep the process as simple as possible, the tracking device transfers the information to the anchor device wirelessly. In a preferred embodiment, the tracking device transmits the information at a very low power and/or using a very short range and/or highly directional technique so that the information is not received and recorded by the other anchor devices that will be in the premises waiting to be installed (or already installed). The Bluetooth protocol is one option. Infrared transmission is another option.

Alternately, the installer may be required to input into the tracking device through the user interface 618 an ID of the particular anchor device that is being positioned and the anchor device may be adapted to record the position information received from the tracking device when it recognizes its ID as part of the received signal.

The installer then installs the receiver unit at this location, such as by a peeling off the protective backing of an adhesive strip and pressing the unit against the wall to cause it to stick to the wall (step 715).

The installer may then walk to the location in which a second receiving unit is to be installed while the tracking device tracks that movement and then repeat the same process with respect to the second receiving unit. However, in a more preferred embodiment of the invention as outlined in FIG. 7, the installer will actually return to the base position (step 717) and repeat steps 701-715 for each anchor device that is installed. The reason it is more preferable to return to the base location and reset the tracking unit before installing each receiving unit is because any errors in the tracking of the movement of the installer if he or she installs the multiple receivers without returning to the base location and resetting will accumulate over in the installation of a plurality of receivers. This could lead to less accurate recordings of the positions of each subsequently installed receiver.

Accordingly, there is a decision step (721) in which, if another anchor device is to be installed, flow proceeds back to step 701 and steps 701-715 are performed for the next anchor device. When the last anchor device is installed, the process ends at step 723.

Now the position information of the anchor devices that is stored in each anchor device and/or in the tracking device must be downloaded to the controller. In one embodiment of the invention in which this information is stored in the tracking device for all of the anchor devices, the installer may then walk over to the controller and download the information to the controller. This can be accomplished either wirelessly or through a wired connection as previously described with respect to the downloading the position information to the anchor devices themselves. However, in the preferred embodiment described in connection with FIG. 7, the anchors will report their own positions to the controller. They may send this information to the controller every time they transmit a signal to the controller. However, in a preferred embodiment of the invention, this information is transmitted only once and then stored in memory by the controller. This may be done as an initialization process performed after the system has been fully installed. Alternately, the anchor devices may report their locations the first time that they send information about a received beaconing signal to the controller.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A method of installing and determining the positions of a plurality of receivers of a tracking system adapted to receive a beaconing signal from a beacon, said tracking system to be used to determine the location of said beacon based on information gathered by said plurality of receivers as to the position of said beacon relative to the positions of said plurality of receivers based on receipt of said beaconing signal at said plurality of receivers, said method comprising the steps of:

(1) positioning a tracking device at a first location;
 (2) recording coordinates of said first location with said tracking device as a base location;
 (3) moving said tracking device to another location for installing one of said plurality of receivers;
 (4) recording coordinates of said another location with said tracking device as said location of said one of said plurality of receivers wherein said another location is recorded in coordinates relative to said base location; and
 (5) repeating steps (1)-(4) for each of said plurality of receivers.

2. The method of claim 1 wherein step (4) comprises said tracking device tracking the direction and distance of said movement in step (3).

3. The method of claim 2 wherein step (4) comprises tracking said direction using an electronic compass and tracking said distance using a pedometer.

4. The method of claim 2 wherein said base location and said another location coordinates comprise Euclidean coordinates.

5. The method of claim 1 wherein step (4) further comprises tracking said direction using an altimeter.

6. The method of claim 1 wherein step (4) comprises transferring said another location coordinates to said one of said plurality of receivers.

7. The method of claim 6 wherein step (4) comprises transferring said another location coordinates to said one of said plurality of receivers wirelessly.

8. The method of claim 6 further comprising the step of:
(6) storing said another location coordinates of received from said tracking device.

9. The method of claim 8 further comprising the step of:
(7) installing said one of said plurality of receivers at said another location.

10. The method of claim 8 further comprising the step of:
(8) transferring location coordinates of each receiver of said plurality of receivers to a common control device that will use said location coordinates in determining a position of said beacon.

11. The method of claim 9 further comprising the step of:
(9) transferring location coordinates of each receiver of said plurality of receivers to a common control device that will use said location coordinates in determining a position of said beacon.

12. The method of claim 11 wherein step (9) is performed after all receivers of said plurality of receivers have been installed.

13. The method of claim 1 further comprising the step of:
(10) transferring location coordinates of each receiver of said plurality of receivers to a common control device that will use said location coordinates in determining the position of said beacon.

14. The method of claim 13 wherein step (10) is performed after step (5).

15. The method of claim 1 wherein said tracking system is adapted to track the location of a person using said beacon and said plurality of receivers.

16. The method of claim 1 further comprising the steps of:
(11) carrying said beacon by said person wherein said beacon is a wireless transmitting device adapted to transmit said beaconing signal at intervals;
(12) detecting said beaconing signal with said plurality of receivers and determining the strength of said signal received at each of said plurality of receivers;
(13) estimating a position of said person based on said strengths of said received signal at said plurality of receivers;
(14) repeating steps (12) and (13) each time said wireless transmitting device transmits said signal; and
(15) tracking said person's movement by storing said estimates over a multiplicity of said intervals.

17. A method of installing and determining the positions of a plurality of receivers of a tracking system adapted to receive a beaconing signal from a beacon, said tracking system to be used to determine the location of said beacon based on information gathered by said plurality of receivers as to the position of said beacon relative to the positions of said plurality of receivers based on receipt of said beaconing signal at said plurality of receivers, said method comprising the steps of:
(1) recording a first location coordinates as a base location;
(2) moving from said base location to another location selected for installing a one of said receivers;
(3) recording said another location coordinates as said location of said one of said plurality of receivers wherein said another location coordinates is recorded in coordinates relative to said base location; and
(4) repeating steps (1)-(3) for each of said plurality of receivers.

18. The method of claim 1 wherein step (3) comprises transferring said second location to said receiver and further comprising the step of:
(5) said receiver storing its location information received from said tracking device.

19. The method of claim 18 wherein step (3) comprises transferring said another location coordinates to said plurality of receivers wirelessly.

20. The method of claim 19 further comprising the step of:
(6) transferring location coordinates of each receiver of said plurality of receivers to a common control device that will use said location coordinates in determining a position of said beacon.

* * * * *